United States Patent
Sakamoto et al.

(10) Patent No.: US 6,209,389 B1
(45) Date of Patent: *Apr. 3, 2001

(54) ROLLING BEARING UNIT WITH ROTATING SPEED DETECTOR

(75) Inventors: Junshi Sakamoto; Naoki Mitsue; Hiroya Miyazaki, all of Fujisawa (JP)

(73) Assignee: NSK Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/880,918

(22) Filed: Jun. 23, 1997

Related U.S. Application Data

(63) Continuation of application No. 08/590,283, filed on Jan. 23, 1996, now abandoned.

(30) Foreign Application Priority Data

Jan. 23, 1995 (JP) .................................... 7-008366

(51) Int. Cl.⁷ .................................................. G01M 19/00
(52) U.S. Cl. .............................. 73/118.1; 73/493; 73/494; 324/166; 384/448
(58) Field of Search .................................. 73/118.1, 493, 73/494; 324/166, 173, 174, 178, 179, 167, 168; 384/448

(56) References Cited

U.S. PATENT DOCUMENTS

| | | | |
|---|---|---|---|
| 4,161,120 | * 7/1979 | Cloarec | 73/494 |
| 4,907,445 | 3/1990 | Okumura . | |
| 4,968,156 | 11/1990 | Hajzler . | |
| 4,970,462 | 11/1990 | Richmond . | |
| 5,131,763 | * 7/1992 | Caron | 384/448 |
| 5,296,805 | 3/1994 | Clark et al. . | |
| 5,508,608 | * 4/1996 | Goossens | 324/174 |

FOREIGN PATENT DOCUMENTS

| | | |
|---|---|---|
| 0 693 689 | 1/1996 | (EP) . |
| 2 667 947 | 4/1992 | (FR) . |
| 63-97456 | 4/1988 | (JP) . |
| 3-99676 | 10/1991 | (JP) . |

* cited by examiner

Primary Examiner—Robert Raevis
(74) Attorney, Agent, or Firm—Evenson, McKeown, Edwards & Lenahan, P.L.L.C.

(57) ABSTRACT

A rolling bearing unit with rotating speed detector comprises a stationary outer ring member, a rotating inner ring assembly, a rolling elements between the outer ring member and inner ring assembly, a sensor mounted to the outer ring member and a tone wheel mounted to the inner ring assembly and having a cylindrical portion faced to the sensor, such that the portion is formed with an outward facing flange to which a jig can be applied.

6 Claims, 5 Drawing Sheets

ROLLING BEARING UNIT WITH ROTATING SPEED DETECTOR

This application is a continuation of application Ser. No. 08/590,283, filed on Jan. 23, 1996, now abandoned.

FIELD OF THE INVENTION

This invention is related to a rolling bearing unit with rotating speed detector to rotatably support the vehicle wheels with respect to the suspension apparatus and to detect the rotating speed of the vehicle wheels.

DESCRIPTION OF THE PRIOR ART

Various constructions for a rolling bearing unit with rotating speed detector to detect rotating speed of a vehicle wheel are known up to now in order that the vehicle wheel is supported with respect to the suspension freely rotatably while an anti-lock brake system (ABS) or a traction control system (TCS) is controlled.

The rotating speed detector which is installed in the rolling bearing unit with rotating speed detector has a tone wheel which rotates with the vehicle wheel and a sensor which outputs a signal changing in proportion to the rotating speed of the tone wheel.

Various types of tone wheels and sensors are known up to now. The rotating speed detector of the passive type which uses the tone wheel made of magnetic material such that the voltage generated in the coil of the sensor changes according to the rotation of the tone wheel is used widely, because it does not use expensive components.

The passive type of the rotating speed detector which comprises an annular sensor to make the output of the sensor larger as shown, for example, in HATSUMEI KYOKAI Technical Report Publication No. 94-16051 is known in the prior art.

FIGS. 4 and 5 show the rolling bearing unit with rotating speed detector as disclosed in this Technical Report Publication.

A hub 1 has an axially outer end portion which is formed with a flange 2 for wheel fixture on its outer peripheral face, a mid-portion which is formed with an inner ring raceway 3a and a stepped portion 4 on its outer peripheral face, and an axially inner end portion which has an inner ring member 5 provided on its outer peripheral face.

The term "axially outer" in the specification means the outer side in a widthwise direction when installed in the vehicle; left in figures, and the term "axially inner" means the center side in a widthwise direction when installed in the vehicle; right in figures.

The inner ring member 5 is formed with an inner ring raceway 3b and externally fitted to the outer peripheral face of the hub 1 with an axially outer end face thereof abutted against the stepped portion 4.

A male-threaded portion 6 is formed on the axially inner end portion of the hub 1. The inner ring member 5 is fixed at a predetermined location on the outer peripheral face of the hub 1 by means of a nut 7 which is threaded onto the threaded portion 6 and tightened, thus constituting an inner ring assembly together with the hub 1.

There is also the case where, instead of directly forming the inner ring raceway 3a on the outer peripheral face of the hub 1, it is formed as an inner ring member (not shown) separate from the hub 1, and externally fitted to the hub 1 together with the inner ring member 5.

An outer ring member 8 located around the hub 1 has a mid-portion which is provided with an attachment portion 9 on an outer peripheral face thereof, for fixing the outer ring member 8 to a suspension unit (not shown).

An inner peripheral face of the outer ring member 8 is formed with outer ring raceways 10a, 10b opposite to the inner ring raceways 3a, 3b respectively.

A plurality of rolling elements 11, specifically balls, are respectively provided between the two inner ring raceways 3a, 3b and the pair of outer ring raceways 10a, 10b, so that the hub 1 is rotatable inside the outer ring member 8.

In the case of a hub unit for heavy vehicles, tapered rollers are used for the rolling elements instead of the balls shown FIGS. 4 and 5.

A seal ring 12 is fitted between the inner peripheral face at the axially outer end of the outer ring member 8, and the outer peripheral face of the hub 1, to cover the opening at axially outer end of the space in which the plurality of rolling elements 11 are provided between the inner peripheral face of the outer ring member 8 and the outer peripheral face of the hub 1.

A tone wheel 13 has a base end portion (left end in FIGS. 4 and 5) which is externally fixed to a portion on an axially inner end of the inner ring member 5 which is spaced away from the inner ring raceway 3b.

The tone wheel 13 is made of magnetic metal plate such as steel plate, and is entirely annular or short-cylindrical. The tone wheel 13 comprises a smaller-diameter section 14 and a larger-diameter section 15 that are continuous through a stepped section 16 and concentric with each other. This kind of tone wheel 13 is fixed to and supported by the inner ring member 5, such that the larger-diameter section 15 is fitted around the outer peripheral face on the axially inner end portion of the inner ring member 5, so that the stepped section 16 comes in contact with the axially inner edge of the inner ring member 5. Therefore, the smaller-diameter section 14 is supported so that it is concentric with the inner ring member 5.

There are several through holes 17 formed around the smaller-diameter section 14 at equal intervals in the circumferential direction to form a first cut-out section where the magnetic characteristics change alternately at equal intervals in the circumferential direction.

These through holes 17 are identical in shape and specifically rectangular shaped to extend in the axial direction (left and right in FIGS. 4 and 5). Only the cross section of one of the through holes 17 is shown in figures for simplicity.

An opening portion at the axially inner end portion of the outer ring member 8 is covered with a cover 18 made for example by deep drawing a metal sheet such as stainless steel plate, or aluminum alloy plate into the form of a bottomed cylinder.

An annular synthetic resin block 21 in which is embedded an annular sensor 20 is fixed and retained within the cylindrical portion 19 of the cover 18. This sensor 20 comprises a permanent magnet 22, a stator 23 made of magnetic material such as steel plate, and a coil 24. By embedding the permanent magnet 22, stator 23 and coil 24 in the synthetic resin block 21, the sensor 20 can be made generally annular.

Of these components which make up the sensor 20, the permanent magnet 22 is formed in a generally annular or circular ring shape and magnetized so that its magnetic orientation is in the radial direction. The inner peripheral face of this permanent magnet 22 is faced, through a small clearance 25, to the outer peripheral face of a base portion of the smaller diameter section 14 of the tone wheel 13 where the through holes 17 are not formed.

The stator 23 is formed in a generally annular shape and has a radially outer cylindrical section 26 and a radially inner cylindrical section 27 connected to each other through a radial section in a substantially J-shaped cross section. The inner peripheral face on the axially outer end of the radially outer cylindrical section 26 of the stator 23 is very near or comes in contact with the outer peripheral face of the permanent magnet 22. Moreover, the inner peripheral face of the radially inner cylindrical section 27 of the stator 23 is faced to a tip portion of the tone wheel 13 where the through holes 17 are formed.

Furthermore, a plurality of notches 28 with an axial open end are formed in a second cut-out section around the radially inner cylindrical section 27 of the stator 23, so that they are located around the cylindrical section 27 circumferentially with the same pitch as the through holes 17. This pitch is referred to as center-angle pitch. Accordingly, the radially inner cylindrical section 27 is formed so that it is comb-toothed.

The coil 24 is formed by winding a conductive wire around a non-magnetic bobbin 29 so that it is annular shaped, and it is located on the inner peripheral side of the radially outer cylindrical section 26 of the stator 23. The electromotive force (emf) generated in this coil 24 is output from a connector 30 that protrudes from the outside surface of the cover 18.

When using the rolling bearing unit with rotating speed detector constructed as described above, as the tone wheel 13 rotates with the hub 1, the density of the magnetic flux flowing in the stator 23, which is faced to the tone wheel 13, changes, so that the voltage generated in the coil 24 changes at a frequency that is proportional to the rotational speed of the hub 1. The theory behind the change of voltage generated in the coil 24 due to the change in density of the magnetic flux flowing in the stator 23 is the same as that applied for rotating speed detector that have been widely used in the prior art.

The reason that the density of the magnetic flux flowing in the stator 23 changes due to the rotation of the tone wheel 13 is described below.

The through holes 17 formed around the tone wheel 13 and the notches 28 formed around the stator 23 have the same pitch, so that as the tone wheel 13 rotates, there are moments when they are all faced to each other at the same time. At the moment when these holes 17 and notches 28 are faced to each other, the magnetic column sections located between each pair of adjacent holes 17 and the magnetic tongue-shaped sections located between each pair of adjacent notches 28 are faced to each other through a small clearance 25 between them. When the magnetic column sections and magnetic tongue-shaped sections are faced to each other, the density of the magnetic flux flowing between the tone wheel 13 and the stator 23 is high.

In contrast to this state, when the holes 17 and notches 28 are half out of phase, the density of the magnetic flux flowing between the tone wheel 13 and the stator 23 becomes low. In other words, in this state, the holes 17 formed around the tone wheel 13 are faced to the tongue-shaped sections, while at the same time, the notches 28 formed around the stator 23 are faced to the column sections. When the column sections are faced to the notches 28 and the tongue-shaped sections are faced to the holes 17, there is a comparatively large gap or clearance between the tone wheel 13 and the stator 23 generally in the circumference. In this state, the density of the magnetic flux flowing between the tone wheel 13 and the stator 23 becomes low. As the result, the voltage generated in the aforementioned coil 24 changes proportionally with the rotational speed of the hub 1.

By using a sensor 20 like described above, the output voltage generated in the coil 24 changes with a frequency proportional to the rotational speed of the hub 1. There is an annular, existing space in the opening end portion of the outer ring member 8. It is possible to utilize this annular limited space for installing the sensor 20 to make the output of the sensor 20 sufficiently large enough to reliably detect the rotational speed of the vehicle wheel rotating together with the hub 1.

The permanent magnet 22, the stator 23 and the coil 24, which make up the sensor 20 are all formed in an annular shape that entirely surrounds the tone wheel 13. Since the magnetic flux that comes from the permanent magnet 22 flows all the way around the stator 23, the amount of magnetic flux that flows generally through the stator 23 can be made sufficiently large enough. Thus the change in voltage on the coil 24 that corresponds to the change in density of the magnetic flux passing through the stator 23, can be made large.

The prior art rotating speed detector having the annular sensor 20 can have a larger output than those having the rod shaped sensor which had been known in the art.

However, in order that the rotating speed detector is so small in size as to be installed in a compact car with an enough sensor output maintained, there are some points to be improved as follows:

Specifically, although not being limited to the construction as shown in FIGS. 4 and 5 with passive-type construction, where the sensor is faced to the magnetic tone wheel, so that as the tone wheel rotates, the voltage generated in the coils of the sensor changes, it is necessary to increase the peripheral speed (rpm) of the part of the tone wheel that is faced to the sensor in order to increase the output of the sensor (voltage generated in the coil). To increase this rpm, it is necessary to increase in size the portion of the tone wheel that is faced to the sensor, or specifically in the case of the construction shown in FIGS. 4 and 5, it is necessary to increase the diameter of the smaller-diameter section 14 formed with the through hole 17.

In regards to this, if the diameter of the small-diameter section 14 is increased, the difference in the diameter of this smaller-diameter section 14 and the diameter of the larger-diameter section 15 that fits around the inner ring member 5 becomes smaller, and the height of the stepped section 16 that connects the smaller-diameter section 14 to the larger-diameter section 15 becomes smaller. In the case of the tone wheel 13 shaped as shown in FIGS. 4 and 5, the stepped section 16 is necessary as a place for putting the jig (not shown) used in pushing the larger-diameter section 15 when fitting it around the inner ring member 5, so it cannot be made too small. Moreover, if the diameter of the larger-diameter section 15 is increased as the diameter of the smaller-diameter section 14 is increased, the outer diameter of the inner ring member 5 around which the larger-diameter section 15 fits must also be increased. Thus, the weight of this inner ring member 5 is increased, and the retainer or cage 31 which holds the rolling elements 11 is inclined to interfere with the inner ring member 5.

If the diameter of the smaller-diameter section 14 without increasing the diameter of the larger-diameter section 15, it will not be possible to place the jig against the stepped section 16, and thus it is necessary to push the edge of the aforementioned smaller-diameter section 14 when fitting the tone wheel 13 around the inner ring member 5. However, because the strength of the smaller-diameter section 14 is weakened by forming several through holes 17 in it, if it were to be pushed hard with the jig, it would be deformed rather easily.

SUMMARY OF THE INVENTION

The rolling-bearing unit with rotating speed detector of this invention was invented with these problems in mind.

An objective of the present invention is to provide a rolling bearing unit with rotating speed detector comprising a stationary outer ring member having an inner peripheral face provided with a first raceway, a rotating inner ring assembly having an outer peripheral face provided with a second raceway, a plurality of rolling elements provided between the outer ring member and the inner ring assembly to provide a rotatable support, a tone wheel fixed to an axial end of the inner ring assembly and having a cylindrical portion fitted to the inner ring assembly and a flange portion extending radially outward from the cylindrical portion so as to be axially pressed by an insertion jig, a cover fixed to an axial end of the outer ring member, and, a sensor fixed to the cover so as to be faced to the tone wheel to output a rotational signal.

DETAILED DESCRIPTION OF THE PREFERRED EMBODIMENTS

The rolling bearing unit with rotating speed detector of this invention, like the prior rolling bearing unit with rotating speed detector mentioned above, comprises an outer ring member that has an outer ring raceway formed around its inner surface and which does not rotate while in use, and an inner ring member that has an inner ring raceway formed around its outer surface and that is faced to the inner surface of the outer ring member so as to rotate while in use, a plurality of rolling elements that rotate freely and are located between the outer ring raceway and inner ring raceway, a cylindrical tone wheel that is attached to an axial end of the inner ring member and that has magnetic characteristics which alternate at equal intervals all the way around its circumference, and a sensor that is supported by the outer ring member so that it is faced to the tone wheel.

Particularly, in the rolling bearing unit with rotating speed detector of this invention, an outward facing flange is formed around the axial end of the tone wheel edge that is fitted around the inner ring member, such that the outward facing flange is bent in the outward radial direction at the end edge.

The rolling bearing unit with rotating speed detector of this invention, constructed as described above, rotatably supports the vehicle wheel in the suspension apparatus, and detects the rpm of the vehicle wheel as in the prior rolling bearing units with rotating speed detector mentioned above.

However, the rolling bearing unit with rotating speed detector of this invention has an outward facing flange against which the installation jig can be pressed against in order to fit the tone wheel around the inner ring member. Accordingly, the diameter of the portion of the tone wheel that is faced to the sensor is increased, thus making it possible to increase the output of the sensor as the tone wheel rotates.

Figure 1:
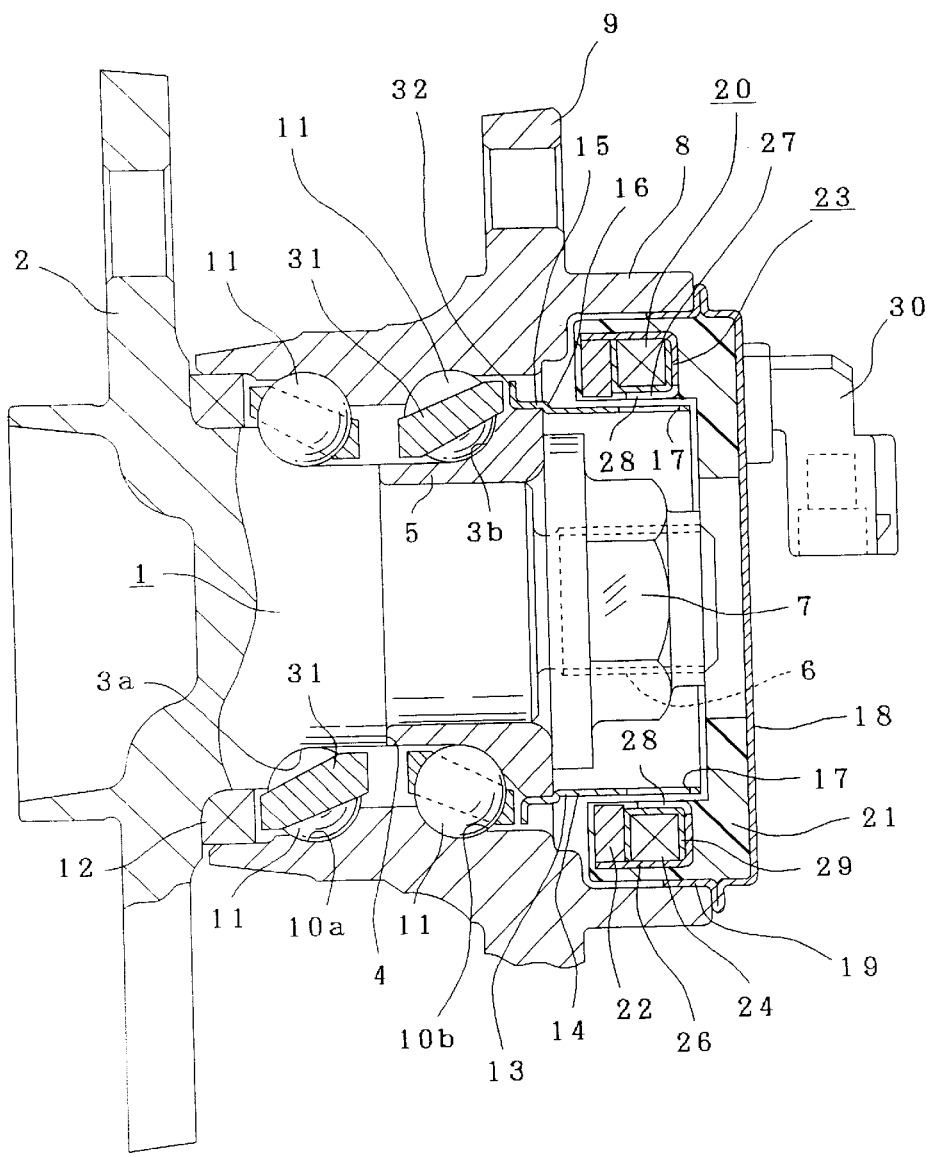
FIG. 1 is a partly cut-away, cross-sectional view showing a first embodiment of the invention.
Figure 2:
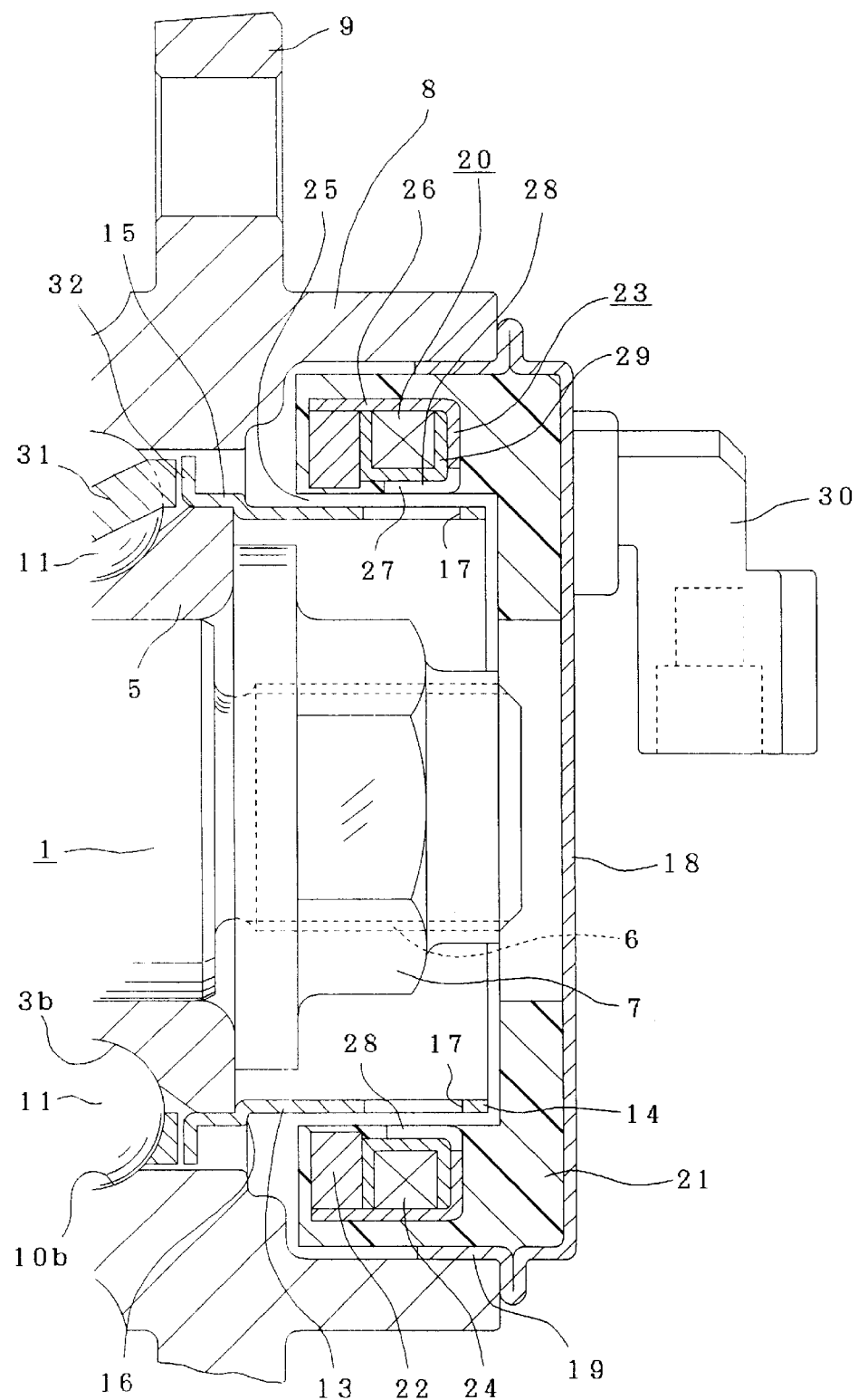
FIG. 2 is an enlarged view of the right portion of FIG. 1.

Now, a first embodiment of this invention is shown in FIGS. 1 and 2. The rolling bearing unit of this embodiment has a tone wheel 13 whose diameter of the portion where several holes 17 are formed has been increased, and which can be easily fitted around the inner ring member 5 without the tone wheel 13 being damaged. The construction and function of the remaining parts of this roller-bearing unit are nearly the same as in the prior construction described above, therefore the same code numbers will be used for like parts and any redundant explanation will be omitted or simplified. The explanation of this invention will center around its characteristic parts.

Figure 4:
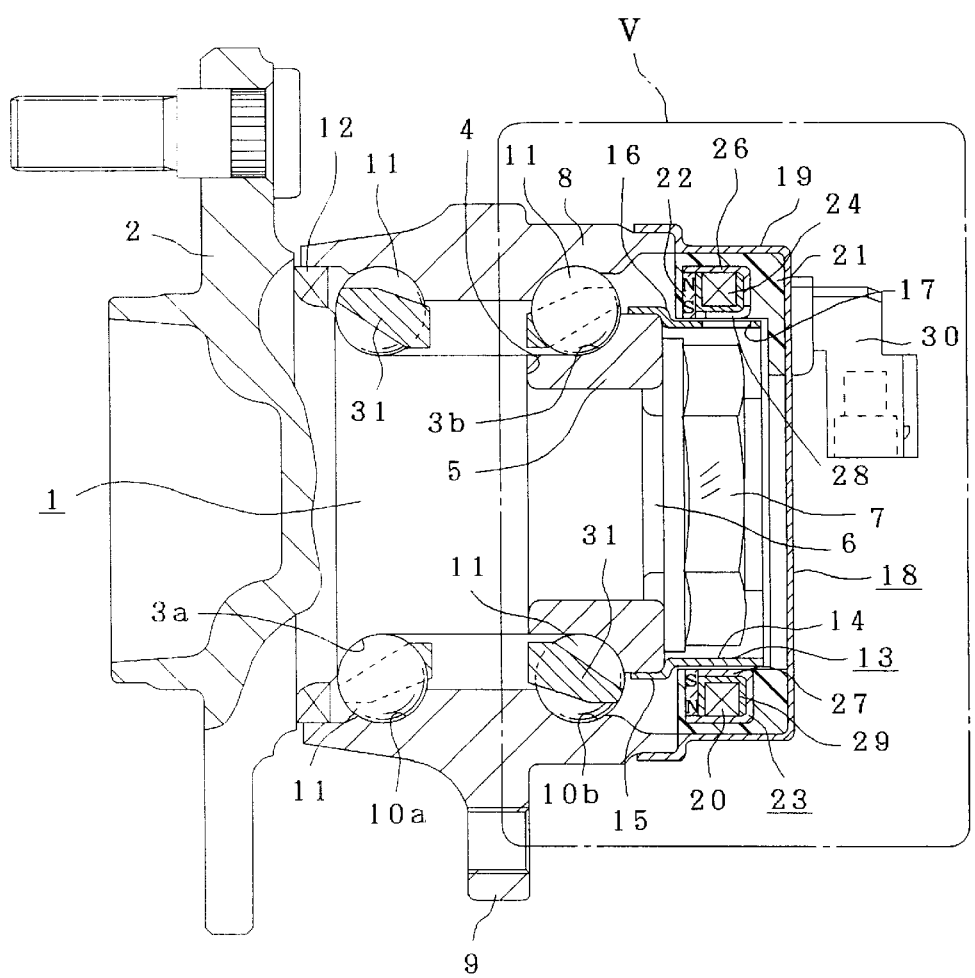
FIG. 4 is a cross-sectional view showing one example of prior construction.
Figure 5:
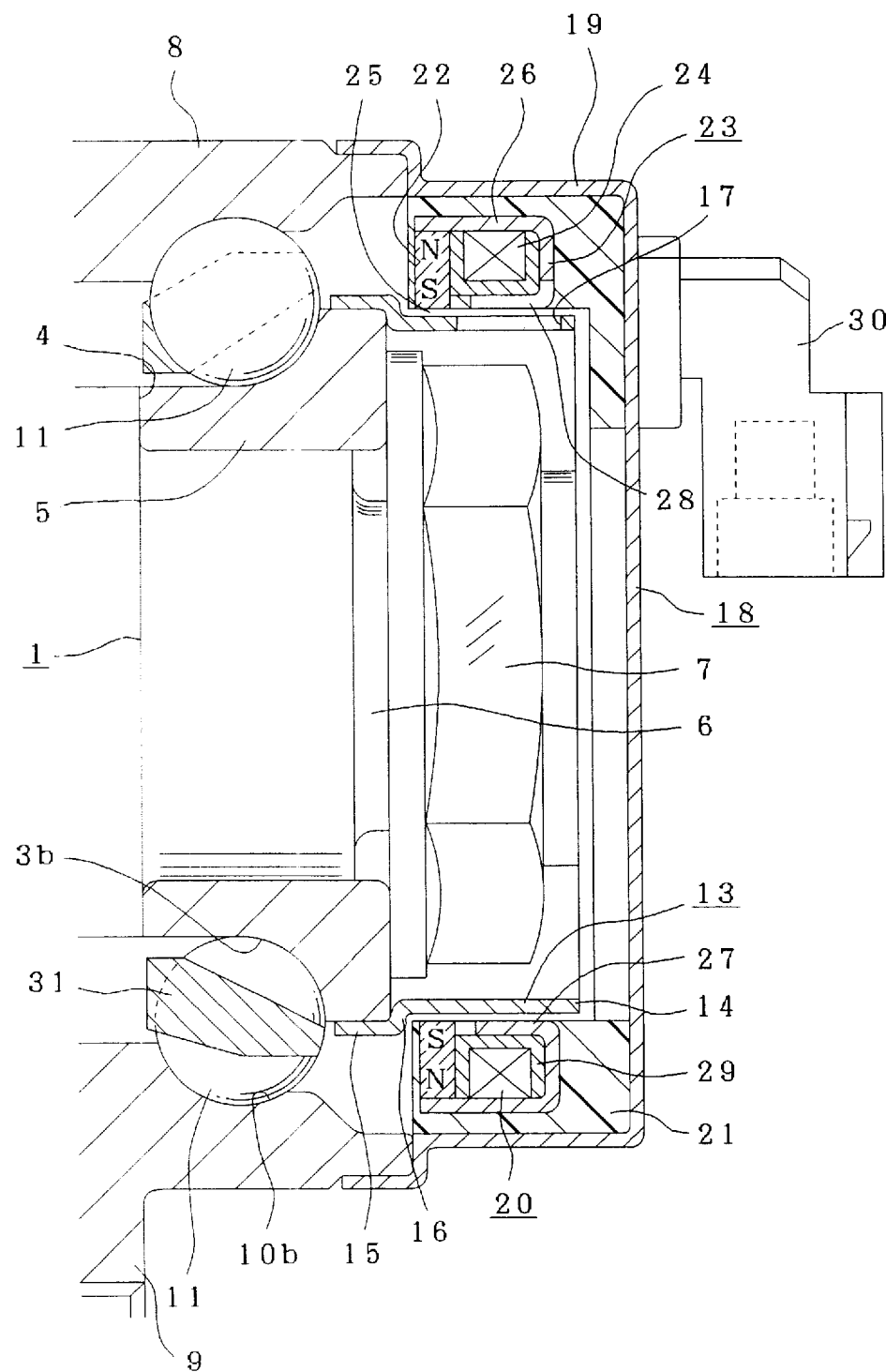
FIG. 5 is an enlarged view of section V of FIG. 4.

The aforementioned tone wheel 13 is manufactured from a magnetic material such as steel plate and is formed so that it is entirely cylindrical. As in the case of the tone wheel 13 (see FIGS. 4 and 5) used in the prior construction as described above, this tone wheel 13 comprises a smaller-diameter section 14 and a larger-diameter section 15 which are concentric and which are continuous through a stepped section 16. Moreover, on the outer end in the axial direction of the tone wheel 13 of the roller-bearing unit with rpm detector of this invention, there is an outward facing flange 32 around the edge of the larger-diameter section 15 that is fitted around the inner ring member 5 which forms the inner ring assembly together with the hub 1.

The flange 32 is formed integral with the larger diameter section 15 such that the magnetic metal plate for the tone wheel 13 is bent outward in the radial direction at the axially outer end edge of the larger diameter section 15.

Thus, the larger-diameter section 15 of this tone wheel 13 is fitted around the outer peripheral surface of the inner ring member 5 at its axially inner end. Specifically with the aforementioned stepped section 16 placed into direct contact with the end of this inner ring member 5, the tone wheel 13 is securely supported by this inner ring member 5, so that the smaller-diameter section 14 is concentric with the inner ring member 5.

A plurality of through holes 17 are formed around the smaller-diameter section 14 so that they are evenly spaced around in the circumferential direction, and these holes 17 cause the magnetic characteristics of the smaller-diameter section 14 to change alternately at evenly spaced intervals in the circumferential direction. These holes 17 have the same shape and specifically are rectangular and long in the axial direction.

In this invention, when fitting the larger-diameter section 15 of the aforementioned tone wheel 13 around the outer surface of the axially inner end of the inner ring member 5, the installation jig (not shown) is brought into contact and axially presses against the aforementioned outward facing flange 32.

Differing from the previously described prior art construction, the height of the stepped section 16 is small, so that it is difficult to use the installation jig on it. In other words, this stepped section 16 is provided only for coming in contact with the edge of the inner ring member 5 to regulate how much the larger-diameter section 15 is pressed toward the inner ring member 5, together with its function as a stopper to keep the axial center of the inner ring member 5 lined up with the axial center of the tone wheel 13, and it does not function as a surface for applying the installation jig.

In this way, in the rolling bearing unit with rpm detector of this invention, by pressing the installation jig against the outward flange 32, it is possible to fit the tone wheel 13 around the axially inner end of the inner ring member 5 which makes up the inner assembly together with the hub 1. When doing this fitting operation, there is no force applied to the smaller-diameter section 14 which is formed with the through holes 17. Accordingly, there is no deformation of this smaller-diameter section 14.

In this way, it is possible to install the tone wheel 13 even though the height of the stepped section 16 is reduced, therefore it is possible to increase the diameter of the smaller-diameter section 14, which is the portion that is faced to the sensor 20, and thus increase the output from the sensor 20 as the tone wheel 13 rotates. In other words, the peripheral speed (rpm) of the smaller-diameter section 14 is increased, so that sudden changes in the density of the magnetic flux flowing through the aforementioned sensor 20 become clearer, thus making it possible to increase the output of the sensor 20.

Also, if the outer diameter of the aforementioned flange section 32 is made a little smaller than the inner diameter of the axially inner end of the outer ring member 8, so that the outer peripheral edge of the outward facing flange 32 is faced to the inner peripheral surface of the outer ring member 8 through a small gap, it is possible to prevent the grease located in the area of the rolling elements 11 from flowing out into the area of the sensor 20. Consequently, it prevents the grease in the area of the rolling elements 11 from becoming short in amount, thus making it possible to maintain the lubrication of this area for a longer period of time, as well as to prevent the sensor 20 and tone wheel 13 from becoming dirty and damaged due to the grease.

In the embodiment shown in the figures, a cover 18 for covering the axially inner opening of the outer ring member 8, has a cylindrical section 19 which is fitted into the axially inner end of the outer ring member 8. However the shape of this cover 18 is not a key point of this invention and the cover 18 used in the previously described prior construction may be used.

Figure 3:
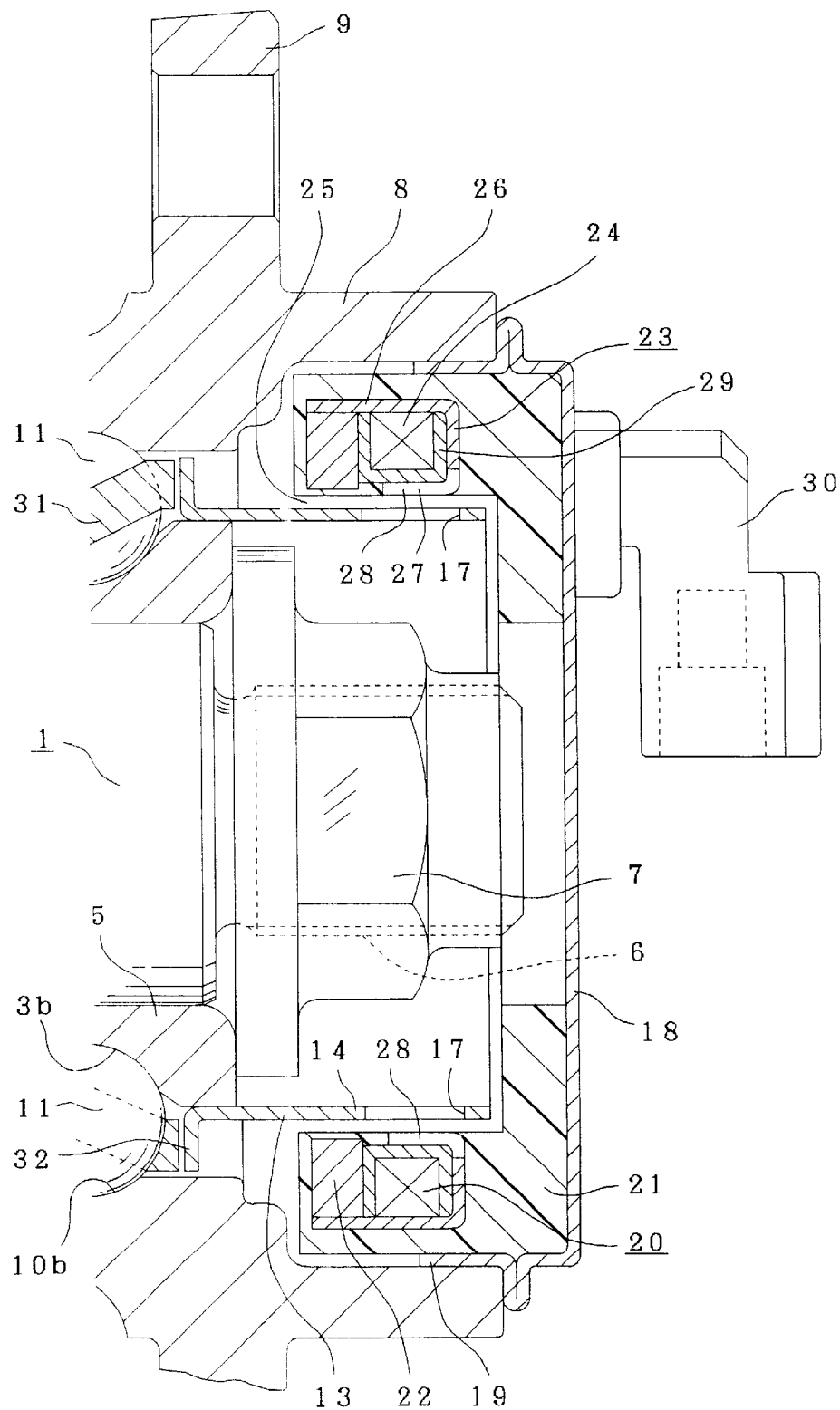
FIG. 3 is shows a second embodiment of the invention and shows the same portion as shown in FIG. 2.

Next, FIG. 3 shows a second embodiment of the invention. The tone wheel 13 used in this embodiment comprises a simple cylindrical section 14 whose diameter is the same along its entire length, and an outward facing flange 32 has been formed around its axially outer edge. Moreover, the axially outer end of this cylindrical section 14 is fitted around the axially inner end of the inner ring member 5. In the tone wheel 13 of this embodiment of the invention, different from the structures where the stepped section 16 was formed (see FIGS. 1, 2, 4 and 5), there is no stepped section, and it is possible to increase by that amount the diameter of the section where the through holes 17 are formed and faced to the sensor 20, thus making it possible to increase the output of the sensor 20. However, since there is no stepped section to function as a stopper, it is necessary to regulate the amount that the tone wheel 13 is pressed against the aforementioned inner ring member 5 and to line up the center of the tone wheel 13 by the amount of displacement of the installation jig which pushes the aforementioned outward facing flange 32. The rest of the construction of this embodiment is the substantially same as in the first embodiment.

It is not shown in the figures, however it is possible to use notches in the place of the holes 17 shown in the embodiments in the figures, in the cut-out section to cause a change in the magnetic characteristics around the circumference of the portion of the tone wheel 13 which is faced to the sensor 20. If notches are formed around a portion of the tone wheel 13, they are formed in a comb-tooth shape.

In the rolling bearing unit with rpm detector of this invention, constructed and used as described above, the tone wheel is not deformed as it is installed, and the diameter of the portion of this tone wheel that is faced to the sensor is increased, thus making it possible to increase the output of the sensor. Therefore, it is possible to have adequate output from the sensor even for a small rolling bearing unit with rpm detector.

What is claimed is:

1. A rolling bearing unit comprising:

a stationary ring member having a first raceway and a cylindrical portion formed with a peripheral surface, a rotating ring member having a second raceway facing the first raceway with rolling elements therebetween and a cylindrical portion formed with a peripheral surface which faces the peripheral surface of the cylindrical portion of the stationary ring member, the cylindrical portion having a shoulder section, a tone wheel formed in an annular shape so as to have a detected portion with magnetic characteristics circumferentially alternately changing, a cylindrical section fitted over the peripheral surface of the cylindrical portion of the rotating ring member, a flange extending in a direction from the peripheral surface of the cylindrical portion of the rotating ring member towards the peripheral surface of the cylindrical portion of the stationary ring member to receive a force which presses the tone wheel, and an abutting face formed between the cylindrical section and the detected portion so as to be abutted to the shoulder section of the cylindrical portion of the rotating ring member, and a sensor facing the tone wheel to detect the rotation of the rotating ring member.

2. A process of assembling a rolling bearing unit comprising:

providing a stationary ring member having a first raceway and a cylindrical portion formed with a peripheral surface, a rotating ring member having a second raceway facing the first raceway with rolling elements therebetween, a cylindrical portion formed with a peripheral surface which faces the peripheral surface of the cylindrical portion of the stationary ring member, and a shoulder section on the cylindrical portion, a tone wheel formed in an annular shape so as to have a detected portion with magnetic characteristics circumferentially alternately changing, a cylindrical section fitted over the peripheral surface of the cylindrical portion of the rotating ring member, a flange portion extending in a direction from the peripheral surface of the cylindrical portion of the rotating ring member towards the peripheral surface of the cylindrical portion of the stationary ring member to receive a force which presses the tone wheel, and an abutting face formed between the cylindrical section and the detected portion so as to be abutted to the shoulder section on the cylindrical portion of the rotating ring member, and a sensor facing the tone wheel to detect the rotation of the rotating ring member, and forcing the flange portion for press-fitting the tone wheel over the peripheral surface of the cylindrical portion of the rotating ring member.

3. A rolling bearing unit comprising:

a stationary ring member having a first raceway and a cylindrical portion formed with a peripheral surface, a rotating ring member having a second raceway which faces the first raceway with rolling elements therebetween, a cylindrical portion of which has a peripheral surface facing the peripheral surface of the cylindrical portion of the stationary ring member, the cylindrical portion of the rotating ring member having a shoulder section, a tone wheel which is formed in an annular shape to be fixed to the peripheral surface of the cylindrical portion of the rotating ring member and formed with a detected portion the magnetic characteristics of which change circumferentially alternately, a flange portion extending in a direction from the peripheral surface of the cylindrical portion of the rotating ring member towards the peripheral surface of the cylindrical portion of the stationary ring member so as to prevent grease from flowing out of an interior of the rolling bearing unit during rotation of the rotating ring member, and an abutting face formed between a cylindrical section and the detected portion so as to be abutted to the shoulder section of the cylindrical portion of the rotating ring member, and a sensor facing the tone wheel to detect the rotation of the rotating ring member.

4. A rolling bearing unit comprising:

a stationary ring member having a first raceway and a cylindrical portion formed with a peripheral surface;

a rotating ring member having a second raceway facing the first raceway with rolling elements therebetween and a cylindrical portion formed with a peripheral surface which faces the peripheral surface of the cylindrical portion of the stationary ring member, a tone wheel made of a single metal plate ring and formed in an annular shape so as to have a detected portion with circumferentially alternately changing magnetic characteristics, a cylindrical section fitted over the peripheral surface of the cylindrical portion of the rotating ring member, and a flange portion extending in a direction from the peripheral surface of the cylindrical portion of the rotating ring member towards the peripheral surface of the cylindrical portion of the stationary ring member to receive a force which presses the tone wheel, and a sensor facing the tone wheel to detect the rotation of the rotating ring member.

5. A process of assembling a rolling bearing unit comprising:

providing a stationary ring member having a first raceway and a cylindrical portion formed with a peripheral surface, a rotating ring member having a second raceway facing the first raceway with rolling elements therebetween and a cylindrical portion formed with a peripheral surface which faces the peripheral surface of the cylindrical portion of the stationary ring member, a tone wheel made of a single metal plate ring and formed in an annular shape so as to have a detected portion with circumferentially alternately changing magnetic characteristics, a cylindrical section fitted over the peripheral surface of the cylindrical portion of the rotating ring member, and a flange portion extending in a direction from the peripheral surface of the cylindrical portion of the rotating ring member towards the peripheral surface of the cylindrical portion of the stationary ring member to receive a force which presses the tone wheel, and a sensor facing the tone wheel to detect the rotation of the rotating ring member, and forcing the flange portion for press-fitting the tone wheel over the peripheral surface of the cylindrical portion of the rotating ring member.

6. A rolling bearing unit comprising:

a stationary ring member having a first raceway and a cylindrical portion formed with a peripheral surface, a rotating ring member having a second raceway which faces the first raceway with rolling elements therebetween, and a cylindrical portion which has a peripheral surface facing the peripheral surface of the cylindrical portion of the stationary ring member, a tone wheel made of a single metal plate ring and formed in an annular shape to be fixed to the peripheral surface of the cylindrical portion of the rotating ring member, said tone wheel formed with a detected portion the magnetic characteristics of which change circumferentially alternately, and a flange portion extending in a direction from the peripheral surface of the cylindrical portion of the rotating ring member towards the peripheral surface of the cylindrical portion of the stationary ring member so as to prevent grease from flowing out of an interior of the rolling bearing unit during rotation of the rotating ring member, and a sensor facing the tone wheel to detect the rotation of the rotating ring member.

* * * * *